Figure 3:
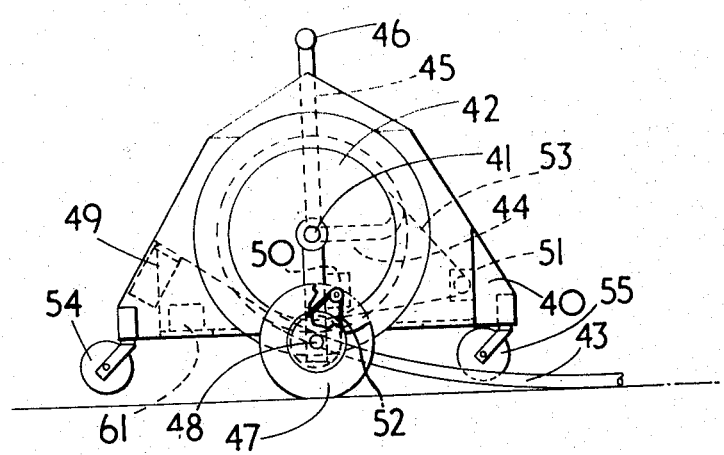

United States Patent [19]

Ivemy et al.

[11] 3,770,202
[45] Nov. 6, 1973

[54] TRAVELLING IRRIGATION MACHINE

[75] Inventors: Alan Ivemy, Ringwood; Theo Sherwen, Chippenham; Tony Pentelow, Kettering, all of England

[73] Assignee: Wright Rain Limited, Ringwood, Hampshire, England

[22] Filed: Dec. 21, 1972

[21] Appl. No.: 317,292

[30] Foreign Application Priority Data
Dec. 23, 1971  Great Britain .................. 60,029/71

[52] U.S. Cl.................. 239/184, 239/183, 239/191
[51] Int. Cl............................................. B05b 3/18
[58] Field of Search ............ 239/156–158, 173, 175, 183, 186, 184, 187, 191, 263, 189, 192, 185

[56] References Cited
UNITED STATES PATENTS

| | | | |
|---|---|---|---|
| 3,235,009 | 2/1966 | Nelson | 239/184 X |
| 3,477,643 | 11/1969 | Bruniga | 239/184 X |
| 3,507,336 | 4/1970 | Nelson | 239/183 X |
| 3,687,372 | 8/1972 | Badcock | 239/183 |

Primary Examiner—Robert S. Ward, Jr.
Attorney—John A. Mawhinney

[57] ABSTRACT

An irrigation machine comprising a wheeled carriage supporting a hose-storing drum carrying a hose having one end connected through the axle of the drum to a spraying device mounted on the carriage and having at its other end a connection for attachment to a hydrant, whereby the spraying device is continuously supplied with water during operation of the machine, a reversible first drive for driving ground-engaging wheels of the carriage and a second drive for rotating the drum in a hose-winding sense, the second drive being overridden to permit the drum to be turned in an opposite direction by the pull of the hose as it unwinds when the wheels are driven away from the hydrant.

10 Claims, 6 Drawing Figures

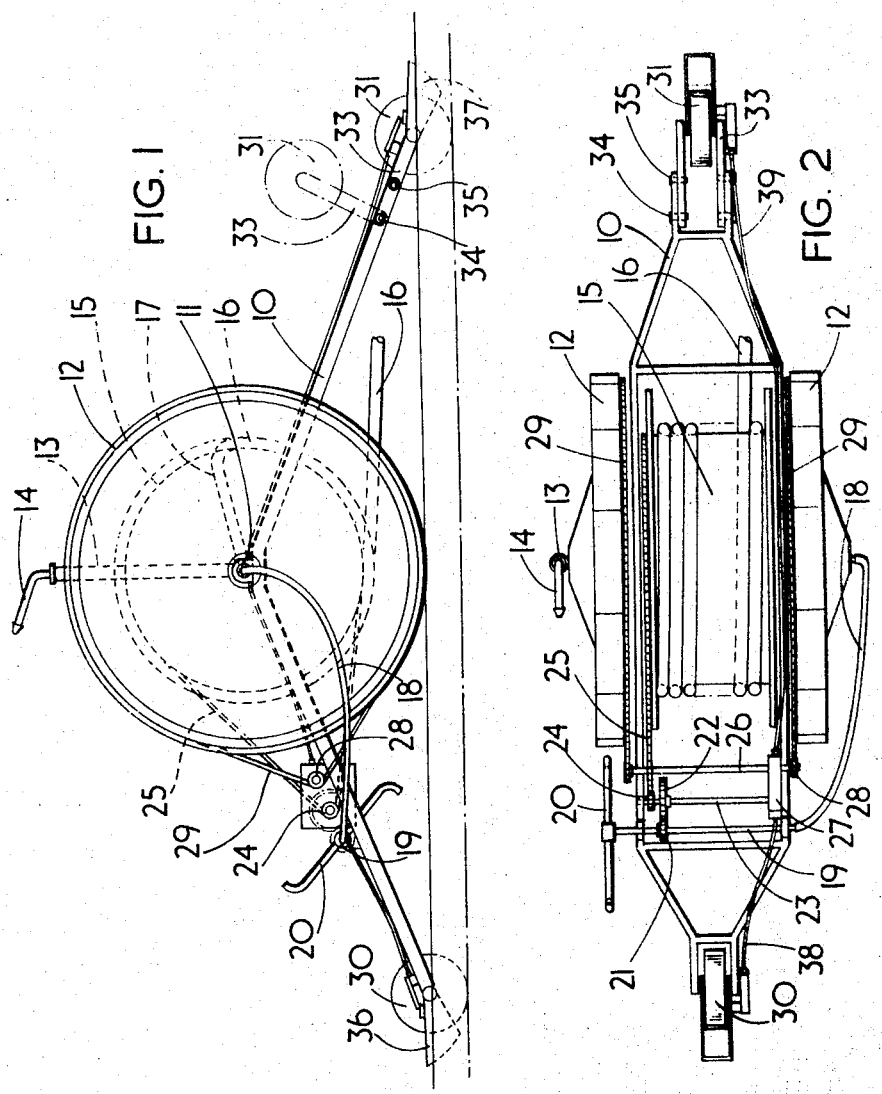

TRAVELLING IRRIGATION MACHINE

The invention relates to a travelling irrigation machine of the kind comprising a spraying device supplied with water from a hose attached at the end remote from the machine to a fixed hydrant. In known machines of this kind the hose is dragged along the ground behind the machine and therefore will impart considerable drag on the machine and also cause damage to crops as it is dragged along the ground by the machine. An object of the invention is to provide an irrigation machine of the foregoing kind in which the hose is unwound from a drum as the machine is propelled away from the hydrant and is wound on to the drum as the machine is propelled towards the hydrant.

According to the invention, an irrigation machine comprises a wheeled carriage supporting a hose-storing drum carrying a hose having one end connected through the axle of the drum to a spraying device mounted on the carriage and having at its other end a connection for attachment to a hydrant, whereby the spraying device is continuously supplied with water during operation of the machine, first driving means for driving ground-engaging wheels of the carriage and second driving means for rotating the drum in a hose-winding sense, the first driving means being reversible to change the direction of motion of the carriage and the second driving means being capable of being over-ridden to permit the drum to be turned in an opposite direction by the pull of the hose as it unwinds when the ground-engaging wheels are driven away from the hydrant.

The carriage may support at least one engine or other prime-mover for operating the first and second driving means. Alternatively, to avoid having an engine or other prime mover mounted on the carriage, the first and second driving means may each be separate transmission devices driven from a common reaction spinner mounted on the carriage and continuously supplied with water through the hose during operation of the machine.

The machine may be guided by any convenient guidance system, e.g. a guidance cable buried in a trench or laid along the ground and a controller mounted on the carriage and responsive to signals carried by the cable. Alternatively, the carriage may have fore-and-aft guidance wheels located in a pre-formed guidance track. The latter may simply be a furrow or trench performed by a plough. Each guidance wheel may carry means for sensing when it has reached the corresponding end of the guidance track and for reversing said first driving means to reverse the direction of rotation of the ground-engaging wheels.

Figure 4:
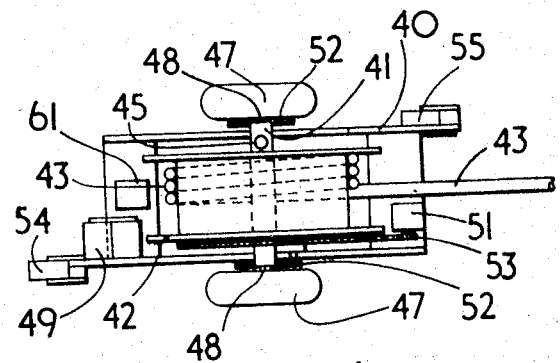
Figure 5:
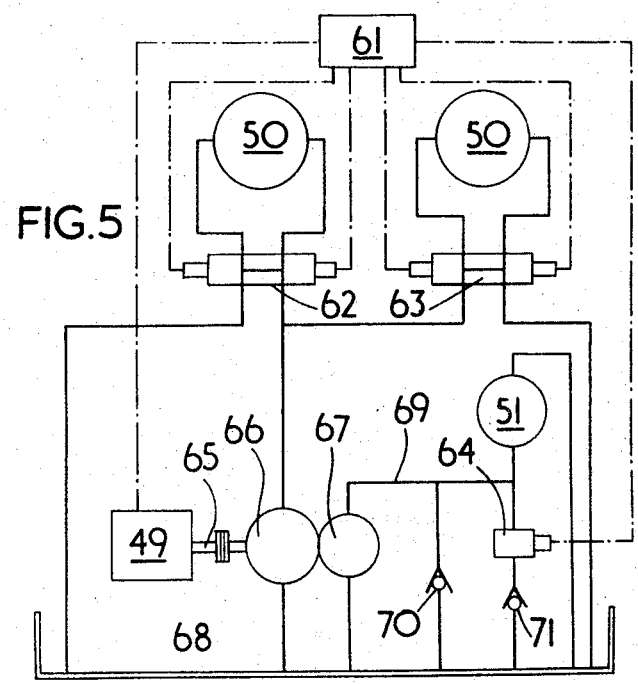

By way of example, two irrigation machines in accordance with the invention and their operation are now described with reference to the accompanying drawings, in which:

FIG. 1 is an elevation of the first machine;
FIG. 2 is a plan view of the first machine;
FIG. 3 is an elevation of the second machine;
FIG. 4 is a plan view of the second machine;
FIG. 5 is a diagram showing a combined electrical and fluid-operable control circuit for the second machine, and
FIG. 6 comprises diagrams showing successive modes of operation of each machine during one complete sequence of operation thereof.

Referring firstly to FIGS. 1 and 2, the machine includes a carriage comprising a frame 10 supporting a tubular transverse axle 11 on which two ground-engaging wheels 12 are freely rotatable. The frame also supports an upright tubular column 13 providing at its upper end a spraying device, (to be described hereinafter). The axle 11 also carries a drum 15 of smaller outside diameter than the wheels 12. A hose 16 is wound on the drum 15 which has a capacity sufficient to carry the hose when fully wound on the drum without the outer convolutions of the hose extending radially beyond the outside diameter of the drum 15. The radially inner end portion 17 of the hose 16 is led radially inwardly to the tubular axle 11 to which the end portion 17 is permanently connected. The outer end of the hose 16 has a connector (not shown) whereby the hose is connectable for use to a fixed hydrant. When the hose is connected to the hydrant and the latter is supplying water, the hose runs full and supplies water continuously through the convolutions still wound on the drum to the axle 11 and through the column 13 to the spraying device 14.

The axle 11 also communicates through a pipe 18 with a tubular shaft 19 on which a reaction spinner 20 is carried. The shaft 19 is mounted on the frame 10 parallel with the axle 11 and is connected through meshing pinions 21, 22 with a lay shaft 23 carrying a driving sprocket 24 engaging a chain 25 carried on the drum 15. The drum 15 is continuously driven by the chain 25 in the clockwise direction as viewed in FIG. 1 by the spinner 20 as long as water is being supplied to the spinner and the spraying device 14.

The lay shaft 23 is drivingly connected to another parallel shaft 26 through a reversing gear drive 27. The shaft 26 carries a pair of driving sprockets 28 each connected by a chain 29 to a sprocket co-axial with the respective ground-engaging wheel 12. Thus so long as water is being supplied to the spinner 20, the ground-engaging wheels 12 are driven in unison in either the clockwise or anti-clockwise direction, in FIG. 1, according to the setting of the reversing gear drive 27. The operation of the reversing gear drive is described hereinafter. In addition to driving the drum 15 and the ground-engaging wheels 12, the spinner 20 will also discharge water and so aid the irrigation of the ground.

The frame 10 carries fore-and-aft guidance wheels 30, 31 arranged at the longitudinal centre line of the machine and mounted to run at a level below the periphery of the ground-engaging wheels 12. Before the machine is used a guidance trench or furrow is dug; for example, by a plough mounted on a tractor which may also be used to tow the machine to the ground to be irrigated. After the guidance trench has been cut the machine is manoeuvred over the trench so that the guidance wheels 30, 31 will travel along the trench. To enable the machine to be towed and for the guidance wheels 30, 31 to be introduced into or removed from the trench, one of the guidance wheels 31 is mounted on the sub-frame 33 pivotally mounted on the frame 10 about pivot pins 34 and secured in operative position by removable pins 35. The sub-frame 33 is swivellable about the pivot pins 34 from the operative position shown in full lines in FIG. 1 upwardly into the position shown in broken lines when the machine is to be towed into and out of the trench. To facilitate the towing of the vehicle, the driving sprockets 24 for the wheels 12 can be disengaged from the shaft 26 or from the chains 29 to enable the wheels 12 to rotate freely and independently.

The guidance wheels 30, 31 each carry a shoe 36, 37 (shown in FIG. 1) connected by a link mechanism 38 or 39 to effect reversal of the reversing gear drive 27. Assuming that the machine is moving to the left in FIG. 1, the shoe 36 carried by the guidance wheel 30 will at the extreme end of the trench engage the corresponding end of the guidance trench or a stop, such as a stake, and will effect reversal of the reversing gear drive 27. The machine will then return to the right in FIG. 1 until the shoe 37 carried by the guidance wheel 31 engages the opposite end of the trench or another stop, such as a stake, when reversal of the reversing gear drive 27 will again take place.

Referring now to FIGS. 3 and 4, the second machine includes a carriage comprising a frame 40 supporting a tubular transverse axle 41 on which a drum 42, like the drum 15 of the first machine, is mounted. A hose 43 is wound on the drum 42 which has a capacity to carry the length of hose which is to be wound on to the drum. The radially inner end portion 44 of the hose 43 is led radially inwardly to the tubular axle 41 to which the end portion 44 is permanently connected. The axle 41 communicates with an upright tube 45 leading to a spraying device (to be decribed hereinafter) and indicated at 46 in FIG. 3. The outer end of the hose 43 has a connector (not shown) whereby the hose is connectable for use to a fixed hydrant. When the hose is connected to the hydrant and the latter is supplying water, the hose runs full and supplies water continuously through the convolutions still wound on the drum 42 to the axle 41 and through the upright pipe 45 to the spraying device 46.

Unlike the first machine, the driven ground-engaging wheels are not mounted on the same shaft as the drum. Instead a pair of driven ground-engaging wheels 47 are mounted for rotation on a lower axle 48 or a pair of stub axles.

The driven ground-engaging wheels 47 do not therefore have to be of larger diameter than the drum as in the first machine, and they are in fact of considerably smaller diameter.

Instead of driving the wheels 47 and the drum 42 from a spinner, as in the first machine, the carriage supports an internal combustion engine 49 or other prime mover. The engine 49 drives a pump (not shown in FIGS. 3 and 4 but illustrated in FIG. 5) which is connected by a fluid circuit (illustrated in FIG. 5) to a separate fluid motor 50 for driving each wheel 47 and a fluid motor 51 for driving the drum 42. The functioning of the fluid circuit is described hereinafter with reference to FIG. 5. Each motor 50 is connected by a transmission 52 (indicated in FIG. 3 by driving and driven sprockets and chain) to its associated wheel 47. The motor 51 is connected by a transmission 53 (indicated in FIG. 3 by driving and driven sprockets and a chain) to the drum 42.

The second machine is steered as described hereinafter with reference to FIG. 5 and a furrow or other guidance trench is not used. Therefore the second machine does not have the fore-and-aft guidance wheels 30, 31 of the first machine. To assist in the manoeuvrability of the second machine, it has fore-and-aft freely-swivellable castor wheels 54, 55 which are offset from the longitudinal centre-line of the carriage to avoid them obstructing or being obstructed by the hose.

FIG. 5 illustrates the electrical and fluid control circuit for the machine illustrated in FIGS. 3 and 4.

The electrical circuit includes a controller 61 which receives electrical control signals from the guidance cable and which transmits on/off signals to the internal combustion engine 49 for driving a pump unit providing pressurised fluid in the fluid control circuit, switching signals to a pair of four-port, three-way solenoid-controlled valves 62, 63 and a signal to the solenoid of a solenoid-controlled valve 64 to be described hereinafter.

The engine 49 has an output shaft 65 connected to drive the pump unit. The latter comprises a pair of gear pumps 66 and 67. The gear pump 66 draws oil or other fluid to be employed in the fluid circuit from a sump 68 and discharges it under pressure to the pair of valves 62 and 63 in parallel. Each of the valves 62, 63 is connected in series with one or other of the motors 50 for driving the respective wheel 47 and with the sump 68. The valves 62, 63 can be individually set by signals from the controller 61 in a forward, stop or reverse position to offset appropriate operation of the associated motor 50. Thus according to the signals received and transmitted by the controller 61, both wheels 47 may be driven forward to effect forward motion of the machine, both wheels may be driven in reverse to effect reverse motion of the machine, or one of the motors may be temporarily stopped or driven in the opposite direction to the other, while the latter is continued to be driven, thereby to effect steering of the machine.

The gear pump 67 is connected through an oil delivery line 69 to deliver oil to the motor 51 for driving the drum 42, the latter always being driven in the hose-winding direction. The oil delivery line 69 from the pump 67 to the motor 51 has a high pressure relief / non-return valve 70 to the sump 68 and, in parallel with the valve 70, the solenoid-controlled valve 64 and a low pressure relief / non-return valve 71. When the hose is to be wound-up, a signal from the controller 61 closes the valve 64 and therefore the motor 51 will be driven with pressurised oil at a pressure up to the high pressure at which the relief valve 70 will open. Thus the motor 51 will be driven with sufficient torque to wind-up the hose. When the hose is to be unwound by the pull of the unwound hose on the drum, a signal from the controller 61 opens the valve 64 and the low pressure relief valve 71 will become operative at a pressure lower than that at which the relief valve 70 is designed to open. Thus the motor 51 will be driven with reduced torque and this is sufficient to act as a brake to prevent the hose from being unwound too quickly when the hose is pulling the drum in the unwinding direction in opposition to the torque imparted by the motor 51.

The provision of on/off signals from the controller 61 to the engine 49 may be dispensed with where other controls are provided, for example a manual starting switch and a trip lever for stopping the engine. Alternatively or additionally the machine may be stopped and started by the controller by signals from the cable to move both valves 62 and 63 into or out of their neutral positions.

The controller 61 may also be used to provide signals for starting and stopping the water supply from the hydrant 60.

Figure 6:
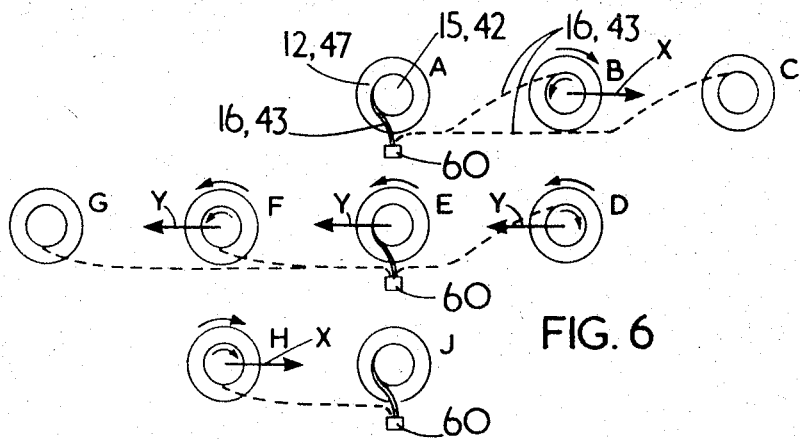

Referring now to FIG. 6, a complete cycle of operations applicable to each of the machines described hereinbefore is now described.

A fixed hydrant 60 is provided in the ground to be irrigated and a guidance trench for the first machine or a guidance cable for the second machine having a length of not more than twice the available length of the hose 16 or 43 is provided adjacent the hydrant 60 which is positioned substantially mid-way along the length of the trench or cable and offset laterally to one side of it.

The machine is positioned adjacent the hydrant in position A with the wheels 12 or 47 on either side of the trench or cable and (in the case of the first machine) with the guidance wheels 30, 31 located in the trench and (in the case of the second machine) with the controller 61 over the cable. (See FIG. 5). An outer end portion of the hose 16, 43 is unrolled from the drum and the connector on the outer end of the hose is attached to the hydrant 60. The machine is operated by actuating a manual control or by an appropriate signal from the cable to drive the wheels 12, 47 to move the machine to the right in the direction of arrow X from the initial position A to the position B. The water supply through the hose is started and the spraying device 14 or 46 will commence spraying. At the same time, the driving torque to the wheels 12 or 47 as viewed in FIG. 6 is continued in the clockwise direction thereby effecting movement of the machine to the right in the direction of arrow X. Additionally driving torque in the clockwise direction, as viewed in FIG. 6, is applied to the drum 15 or 42 in the winding-up sense. Despite this torque applied to the drum, the hose will be unrolled from the drum because the chain drive 25 or 53 is provided with resilient tensioning means (not shown) which will enable the chain drive to be over-ridden by the drum, which will therefore be turned in the opposite direction by the pull of the hose, thereby allowing the latter to be unwound from the drum as the machine is driven to the right. In the second machine the winding-up torque applied when the hose is being unwound is reduced as explained with reference to FIG. 5. By continuing to apply winding-up torque while the hose is being unwound, the unwinding is controlled and the hose is prevented from unwinding too quickly. Position B in FIG. 6 is a typical intermediate position between the initial position A and the extreme position C which occurs when the guidance wheel 31 reaches the right-hand end of the trench (for the first machine) or the controller 61 reaches the end of the guidance cable (for the second machine). In position C, the shoe 37 strikes the end of the trench or the controller responds to the cable signal to reverse the drive to the wheels 12 or 47, i.e., to turn them anti-clockwise; but the direction of rotation of the drum is not reversed, as it is always driven in the clockwise direction, as viewed in FIG. 6. Thus as the machine travels back towards the hydrant 60, in the direction of the arrow Y, the hose 16 or 43 is wound on to the drum 15 or 42 as indicated by position D. The machine is driven through the mid-position E in the direction of arrow Y and as it does so, the hose moves from the top of the drum, as indicated in position D to the bottom of the drum as indicated in position F. Guide means for enabling the hose to move between these two positions may be provided on the machine frame. After the machine has travelled through the mid-position E, the hose will again unwind from the drum, the latter over-ridding the drive thereto, as indicated in position F. At the extreme left-hand end of the trench, the shoe 36 or the controller 61 will effect reversal of the drive to the wheels 12 or 47 as indicated by position G and the machine will be driven back towards the hydrant 60 in the direction of arrow X, passing through the position H. This is another typical intermediate position in which the drum, still being driven in the clockwise direction, winds up the hose. When the machine reaches the hydrant 60, i.e., position J, a stop adjacent the hydrant effects interruption of the water supply or actuates the controller to stop the machine. Alternatively where a stop or stop signal is not provided, the cycle would be repeated. After a cycle or a predetermined number of cycles, the machine may be moved to another position in which a hydrant and guidance trench or cable are provided.

By providing means for reversal of the direction of driving the wheels 11 or 47 and for continuous driving in one direction of the drum 15 or 42, with provision for over-riding the drive thereto, double the length of travel is produced for a predetermined length of hose.

Braking means for the drum 15 (in the first machine) may be necessary to prevent too much hose being unwound when the hose is pulling the drum in the unwinding direction and over-riding the driving chain 25. As aforesaid, in the second machine, the driving torque is reduced when the hose is being unwound to provide a controlled drag on the drum.

In the second machine the controller 61 also receives steering signals if it should deviate from the line of the guidance cable to stop or reverse one of the wheel motors, while the other is continued to be driven, as explained hereinbefore with reference to FIG. 5.

The spraying device 14 or 46 may be a water gun, i.e., a swivellable long range nozzle, as indicated at 14 in FIG. 1 or it may be a fixed boom or a boom mounted for rotation about a horizontal axis and having spraying nozzles spaced apart along its length. A boom is indicated at 46 in FIG. 3. The boom may itself impart reaction for providing motive power to the machine and for driving the drum.

What we claim as our invention and desire to secure by Letters Patent of the United States is:

1. An irrigation machine comprising a wheeled carriage, a hose-storing drum thereon, a hose having one end connected through the axle of the drum, a spraying device mounted on the carriage and supplied with water through said hose and the drum axle, a connection at the other end of said hose for attachment to a hydrant, whereby the spraying device is continuously supplied with water during operation of the machine, ground-engaging wheels supporting said carriage, first driving means for driving said ground-engaging wheels and second driving means for rotating the drum in a hose-winding sense, said first driving means being reversible to change the direction of motion of said carriage and said second driving means being capable of being over-ridden to permit said drum to be turned in an opposite direction by the pull of said hose as it unwinds when said ground-engaging wheels are driven away from the hydrant.

2. A machine as claimed in claim 1 in which at least one engine for operating said first and second driving means is mounted on said carriage.

3. A machine as claimed in claim 1 in which said first and second driving means are each separate transmission devices and a common reaction spinner mounted on the carriage and continuously supplied with water through the hose during operation of the machine is connected to drive said first and second driving means.

4. A machine as claimed in claim 1 including means for guiding the machine along a predetermined track.

5. A machine as claimed in claim 4 in which the track is defined by a guidance cable and said guidance means comprises a controller mounted on the carriage and responsive to signals carried by the cable.

6. A machine as claimed in claim 4 in which the carriage has fore-and-aft guidance wheels located in a preformed guidance track.

7. A machine as claimed in claim 6 in which each said guidance wheel carries means for sensing when it has reached the corresponding end of the guidance track and for reversing said first driving means to reverse the direction of rotation of said ground-engaging wheels.

8. A machine as claimed in claim 1 in which said carriage supports an engine for operating said first and second driving means, said first driving means comprising a first pump driven by said engine and a pair of fluid motors connected to receive pressurised fluid from said first pump and each being individually drivingly-connected to one of said ground-engaging wheels, said second driving means comprising a second pump driven by said engine and a further fluid motor connected to receive pressurised fluid from said second pump and drivingly-connected to said drum-driving motor to drive said drum in the winding-up sense.

9. A machine as claimed in claim 8 in which the machine is arranged to be guided along a predetermined track defined by a guidance cable and the machine includes a controller mounted on said machine and responsive to signals carried by the cable, and a pair of valves connected to control the direction of operation of said fluid motors arranged to drive said ground-engaging wheels, said valves being operable by said controller in response to signals carried by the guidance cable whereby the direction of movement of said machine is reversible, said machine can be started and stopped and said machine can be steered by stopping or reversing one of said motors relative to the other of said motors.

10. A machine as claimed in claim 9 in which a solenoid-operable by-pass valve is provided to divert some of the pressurised fluid to the suction side of said second pump before said fluid is delivered to said further fluid motor, whereby the driving torque to said further fluid motor is reduced when said hose is being unwound from said drum, said further fluid motor thereby acting as a brake to reduce the speed of unwinding of said hose, said controller being connected to energise the solenoid of said solenoid-operable by-pass valve in response to appropriate signals received from the cable.

* * * * *